(12) United States Patent
Lee et al.

(10) Patent No.: US 11,043,977 B2
(45) Date of Patent: Jun. 22, 2021

(54) ELECTRONIC DEVICE AND METHOD FOR DETERMINING RECEPTION PATH OF COMMUNICATION SIGNAL BY ELECTRONIC DEVICE

(71) Applicant: Samsung Electronics Co., Ltd., Suwon-si (KR)

(72) Inventors: Han Bok Lee, Suwon-si (KR); Jeong Hwan Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 35 days.

(21) Appl. No.: 16/480,016

(22) PCT Filed: Jan. 16, 2018

(86) PCT No.: PCT/KR2018/000745
§ 371 (c)(1),
(2) Date: Jul. 23, 2019

(87) PCT Pub. No.: WO2018/135837
PCT Pub. Date: Jul. 26, 2018

(65) Prior Publication Data
US 2019/0386687 A1 Dec. 19, 2019

(30) Foreign Application Priority Data

Jan. 23, 2017 (KR) .................. 10-2017-0010502

(51) Int. Cl.
*H04B 1/00* (2006.01)
*H04B 17/21* (2015.01)
(Continued)

(52) U.S. Cl.
CPC .......... *H04B 1/0057* (2013.01); *H04B 17/21* (2015.01); *H04B 17/318* (2015.01);
(Continued)

(58) Field of Classification Search
CPC .......... H04B 1/0057; H04B 3/00; H04B 1/00; H04B 1/0064; H04B 17/21; H04B 17/309;
(Continued)

(56) References Cited

U.S. PATENT DOCUMENTS

| | | |
|---|---|---|
| 8,681,890 B2 | 3/2014 | Petrovic |
| 9,385,795 B1 | 7/2016 | Ananthanarayanan et al. |

(Continued)

FOREIGN PATENT DOCUMENTS

| | | | |
|---|---|---|---|
| KR | 10-2013-0056634 A | 5/2013 | |
| KR | 10-2013-0087869 A | 8/2013 | |

(Continued)

OTHER PUBLICATIONS

ISA/KR, "International Search Report and Written Opinion of the International Searching Authority," International Application No. PCT/KR2018/00745, dated May 1, 2018, 11 pages.

*Primary Examiner* — Wutchung Chu

(57) ABSTRACT

Disclosed is an electronic device. An electronic device according to an embodiment may include a first antenna, a second antenna, a transceiver, a first RF circuit that includes a first input terminal and a first output terminal and receives a signal in a second band or a signal in a third band from the first antenna, a second RF circuit that includes a second input terminal and a second output terminal and receives the signal in the second band or the signal in the third band from the second antenna, a first electrical path that receives the signal in the third band from the first antenna and includes one end electrically connected with the first antenna and the first input terminal and an opposite end electrically connected with the transceiver, a second electrical path that receives the signal in the second band from the second antenna and includes one end electrically connected with the second antenna and the second input terminal and an oppo- (Continued)

site end electrically connected with the transceiver, and a processor that enables or disables the first RF circuit, the second RF circuit, the first electrical path, and the second electrical path, individually. Moreover, various embodiment found through the disclosure are possible.

14 Claims, 11 Drawing Sheets

(51) Int. Cl.
*H04B 17/318* (2015.01)
*H04B 17/336* (2015.01)
*H01Q 5/10* (2015.01)
*H01Q 1/24* (2006.01)

(52) U.S. Cl.
CPC ........... *H04B 17/336* (2015.01); *H01Q 1/243* (2013.01); *H01Q 5/10* (2015.01)

(58) Field of Classification Search
CPC .... H04B 17/318; H04B 17/336; H04B 1/401; H04B 1/44; H04B 1/48; H04B 7/0404; H04B 1/006; H04B 1/0458; H04B 7/0602; H04B 7/0604; H04B 7/0802; H01Q 1/243; H01Q 5/10; H04W 72/0453; H04W 72/0486; H04W 40/28; H04W 88/06; H04W 52/52
See application file for complete search history.

(56) References Cited

U.S. PATENT DOCUMENTS

| | | | |
|---|---|---|---|
| 9,590,717 B2 | 3/2017 | Kim | |
| 9,602,156 B2 | 3/2017 | Wloczysiak | |
| 9,654,169 B2 | 5/2017 | Wloczysiak | |
| 9,973,404 B2 | 5/2018 | Pelletier et al. | |
| 9,985,680 B2 | 5/2018 | Wloczysiak | |
| 10,193,733 B2* | 1/2019 | Maltsev | H04W 52/0235 |
| 10,230,432 B2 | 3/2019 | Wloczysiak | |
| 2003/0203743 A1* | 10/2003 | Sugar | H04B 1/0057 455/550.1 |
| 2004/0121753 A1* | 6/2004 | Sugar | H04B 1/006 455/333 |
| 2010/0159847 A1* | 6/2010 | Sathath | H04B 1/0082 455/73 |
| 2011/0299630 A1 | 12/2011 | Petrovic | |
| 2013/0273861 A1* | 10/2013 | See | H04B 1/44 455/83 |
| 2013/0337754 A1* | 12/2013 | Khlat | B81B 7/02 455/78 |
| 2014/0092795 A1* | 4/2014 | Granger-Jones | H04L 5/0005 370/297 |
| 2014/0169243 A1* | 6/2014 | Khlat | H04B 7/0602 370/297 |
| 2014/0227982 A1* | 8/2014 | Granger-Jones | H04B 1/0064 455/77 |
| 2014/0334362 A1* | 11/2014 | Granger-Jones | H03J 3/20 370/297 |
| 2014/0376417 A1* | 12/2014 | Khlat | H04L 5/001 370/277 |
| 2015/0110229 A1 | 4/2015 | Kim | |
| 2015/0139015 A1* | 5/2015 | Kadous | H04W 36/00837 370/252 |
| 2015/0303973 A1* | 10/2015 | Wloczysiak | H04B 1/006 455/77 |
| 2015/0304000 A1* | 10/2015 | Wloczysiak | H04B 1/401 455/78 |
| 2015/0318975 A1* | 11/2015 | Lim | H04B 1/0064 370/275 |
| 2016/0119003 A1* | 4/2016 | Granger-Jones | H04L 5/001 370/276 |
| 2016/0204520 A1* | 7/2016 | Dong | H01Q 5/385 343/745 |
| 2016/0218792 A1* | 7/2016 | Kohlmann | H04B 1/0082 |
| 2016/0233895 A1* | 8/2016 | Khlat | H04B 1/0057 |
| 2016/0285716 A1 | 9/2016 | Pelletier et al. | |
| 2017/0155421 A1 | 6/2017 | Wloczysiak | |
| 2017/0207846 A1* | 7/2017 | Khlat | H04B 1/0057 |
| 2017/0230075 A1* | 8/2017 | Sun | H04B 1/005 |
| 2017/0230088 A1 | 8/2017 | Wloczysiak | |
| 2017/0251474 A1* | 8/2017 | Khlat | H04B 1/18 |
| 2017/0264336 A1* | 9/2017 | Saji | H03H 9/6483 |
| 2017/0288765 A1* | 10/2017 | Khlat | H04B 7/0802 |
| 2017/0317710 A1* | 11/2017 | Liu | H04B 1/0057 |
| 2017/0373398 A1* | 12/2017 | Komulainen | H04W 72/0413 |
| 2018/0070250 A1* | 3/2018 | Venkataraman | H04W 72/1284 |
| 2018/0123620 A1* | 5/2018 | Ueno | H04B 1/0057 |
| 2018/0131478 A1* | 5/2018 | Song | H04W 40/02 |
| 2018/0241653 A1 | 8/2018 | Pelletier et al. | |
| 2019/0222237 A1* | 7/2019 | Harada | H03F 3/24 |

FOREIGN PATENT DOCUMENTS

| | | |
|---|---|---|
| KR | 10-2015-0046689 A | 4/2015 |
| KR | 10-2016-0079036 A | 7/2016 |

* cited by examiner

ELECTRONIC DEVICE AND METHOD FOR DETERMINING RECEPTION PATH OF COMMUNICATION SIGNAL BY ELECTRONIC DEVICE

CROSS-REFERENCE TO RELATED APPLICATIONS

This application is a 371 National Stage of International Application No. PCT/KR2018/000745, filed Jan. 16, 2018, which claims priority to Korean Patent Application No. 10-2017-0010502, filed Jan. 23, 2017, the disclosures of which are herein incorporated by reference in their entirety.

BACKGROUND

1. Field

Embodiments of the disclosure relate to a technology for determining a path receiving a communication signal in an electronic device.

2. Description of Related Art

With developments of information communication technologies, network devices such as a base station and the like are installed throughout the country. An electronic device transmits/receives data to/from another electronic device over a network, thus allowing a user to utilize the network freely anywhere in the country.

An antenna is necessarily required to use the network described above. The electronic device may include a plurality of antennas and may also support multiple input multiple output (MIMO) for transmitting/receiving signals through the plurality of antennas at the same time. Also, the electronic device may support carrier aggregation (CA) for aggregating signals in a plurality of frequency bands.

SUMMARY

An electronic device that supports conventional MIMO may fail to support multi MIMO for transmitting/receiving respective signals in a plurality of frequency bands through a plurality of paths at the same time. Meanwhile, because a conventional electronic device receives each of signals in a plurality of frequency bands through a specified path when performing the CA, it may be difficult to improve the data throughput by utilizing various paths. Also, even though the electronic device is able to change paths, because available paths are restricted, the improvement of the data throughput through the path change may be ignorable.

To address at least the above-mentioned problems and/or disadvantages, embodiments of the disclosure are to provide an electronic device including a circuit structure capable of supporting a multi MIMO and a method for utilizing the circuit structure in performing carrier aggregation (CA).

An electronic device according to an embodiment of the disclosure may include a first antenna that resonates in a first band, a second band, and a third band, a second antenna that resonates in the second band and the third band, a transceiver that transmits or receives a signal in the first band, a signal in the second band, and a signal in the third band, a first RF circuit that includes a first input terminal electrically connected with the first antenna and a first output terminal electrically connected with the transceiver and receives the signal in the second band or the signal in the third band from the first antenna, a second RF circuit that includes a second input terminal electrically connected with the second antenna and a second output terminal electrically connected with the transceiver and receives the signal in the second band or the signal in the third band from the second antenna, a first electrical path that receives the signal in the third band from the first antenna, wherein one end of the first electrical path is electrically connected with the first antenna and the first input terminal and an opposite end of the first electrical path is electrically connected with the transceiver, a second electrical path that receives the signal in the second band from the second antenna, wherein one end of the second electrical path is electrically connected with the second antenna and the second input terminal and an opposite end of the second electrical path is electrically connected with the transceiver, and a processor that is electrically connected with the transceiver and enables or disables the first RF circuit, the second RF circuit, the first electrical path, and the second electrical path, individually.

In addition, an electronic device according to an embodiment of the disclosure may include a first antenna that resonates in a first band, a second band, and a third band, a second antenna that resonates in the second band and the third band, a transceiver that transmits or receives a signal in the first band, a signal in the second band, and a signal in the third band, a first RF circuit that receives the signal in the second band or the signal in the third band from the first antenna and provides the signal in the second band or the signal in the third band to the transceiver, a second RF circuit that receives the signal in the second band or the signal in the third band from the second antenna and provides the signal in the second band or the signal in the third band to the transceiver, a first electrical path that receives the signal in the third band from the first antenna and provides the signal in the third band to the transceiver, a second electrical path that receives the signal in the second band from the second antenna and provides the signal in the second band to the transceiver, and a processor electrically that is connected with the transceiver. The processor may allocate one available path among the first RF circuit, the second RF circuit, the first electrical path, and the second electrical path sequentially from a signal having a wider bandwidth from among the signal in the second band and the signal in the third band based on indicators respectively associated with receiving the signal in the second band and the signal in the third band, when the signal in the second band and the signal in the third band are received through the first antenna and the second antenna, and may receive the signal in the second band and the signal in the third band through the allocated paths, respectively.

In addition, a method for determining a communication signal receiving path of an electronic device, according to an embodiment of the disclosure, may include receiving a signal in a first band and a signal in a second band, allocating one available path, which transfers the signal in the first band or the signal in the second band, from among a plurality of paths sequentially from a signal having a wider bandwidth from among the signal in the first band and the signal in the second band based on indicators respectively associated with receiving the signal in the first band and the signal in the second band, and receiving the signal in the first band and the signal in the second band through the allocated paths, respectively.

According to embodiments of the disclosure, an electronic device that supports a multi MIMO may be provided by adopting additional electrical paths receiving signals in various frequency bands.

Also, according to embodiments of the disclosure, the data throughput may be improved through sequential, efficient path allocation from a signal having a wider bandwidth when the CA is performed.

Besides, a variety of effects directly or indirectly understood through this disclosure may be provided.

DETAILED DESCRIPTION

Figure 1:
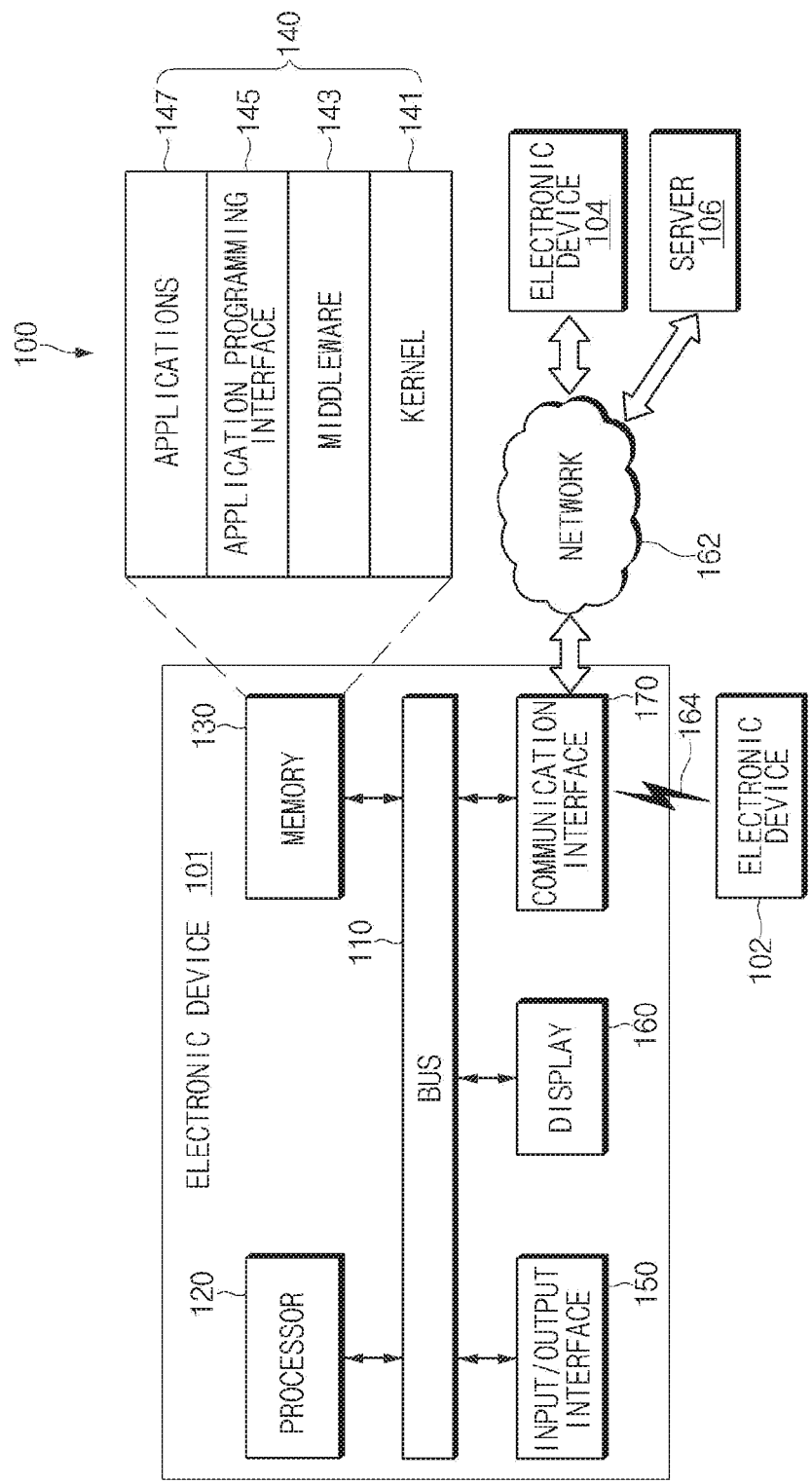
FIG. 1 illustrates an electronic device in a network environment according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various components regardless of the order and/or the priority and to distinguish the relevant components from other components, but do not limit the components. When an component (e.g., a first component) is referred to as being "(operatively or communicatively) coupled with/to" or "connected to" another component (e.g., a second component), the component may be directly coupled with/to or connected to the other component or an intervening component (e.g., a third component) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of operating together with another device or other parts. For example, a" processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 illustrates an electronic device 101 in a network environment 100 according to various embodiments. Referring to FIG. 1, the electronic device 101 may include a bus 110, a processor 120, a memory 130, an input/output interface 150, a display 160, and a communication interface 170. According to an embodiment, the electronic device 101 may not include at least one of the above-described components or may further include other component(s). The bus 110 may interconnect the above-described components 110 to 170 and may include a circuit for conveying communications (e.g., a control message and/or data) among the above-described components. The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store instructions or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing, a character control, or the like. The input/output interface 150 may transmit an instruction or data input from a user or another external device, to other component(s) of the electronic device 101 or may output an instruction or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), power line communication, a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
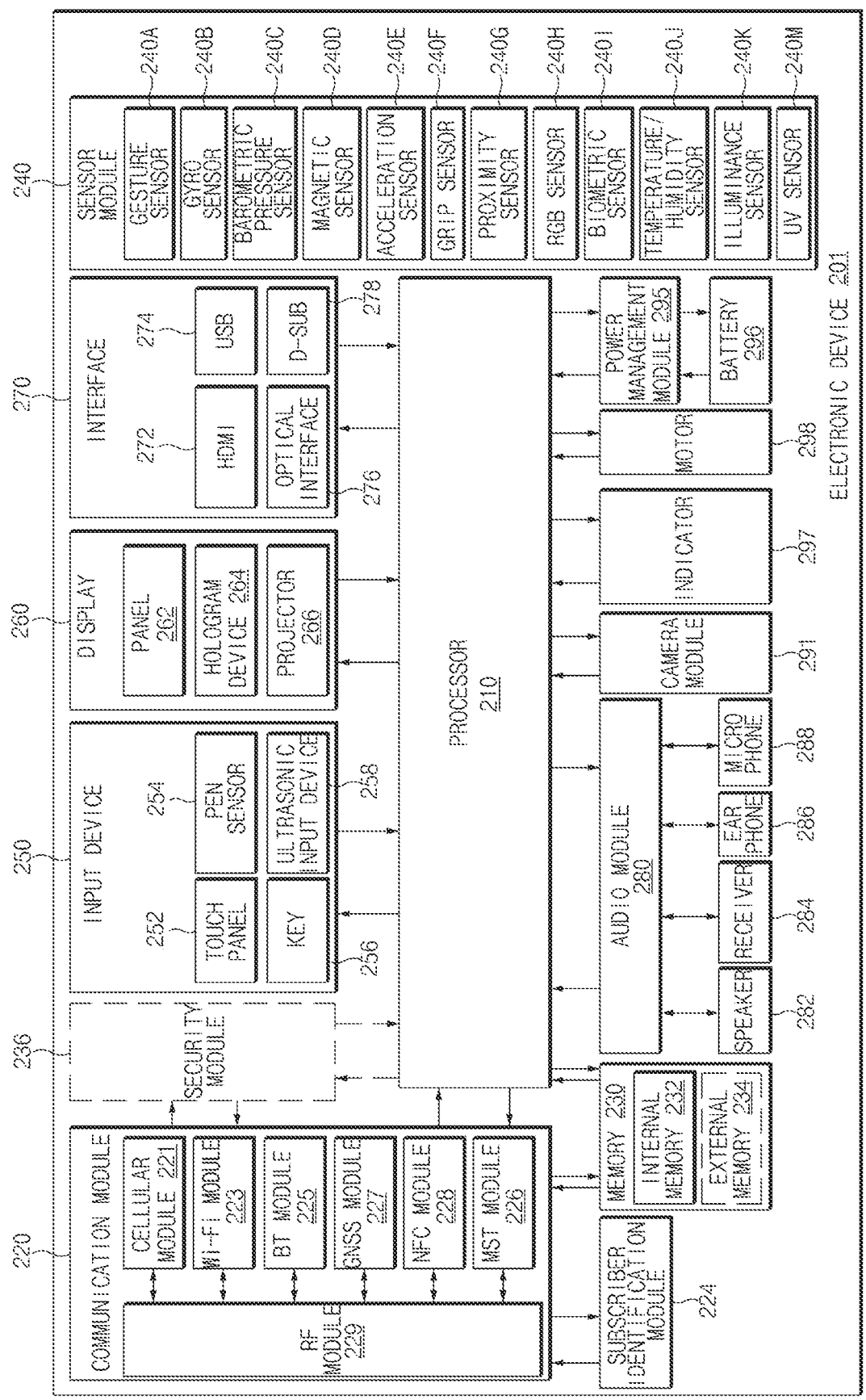
FIG. 2 illustrates a block diagram of an electronic device according to various embodiments.

FIG. 2 illustrates a block diagram of an electronic device 201, according to various embodiments. An electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module. The subscriber identification module 224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like.

The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MHL)

interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned components of the electronic device according to various embodiments of the disclosure may be configured with one or more components, and the names of the components may be changed according to the type of the electronic device. In various embodiments, some components of the electronic device (e.g., the electronic device 201) may be omitted or other additional components may be added. Furthermore, some of the components of the electronic device may be combined with each other so as to form one entity, so that the functions of the components may be performed in the same manner as before the combination.

Figure 3:
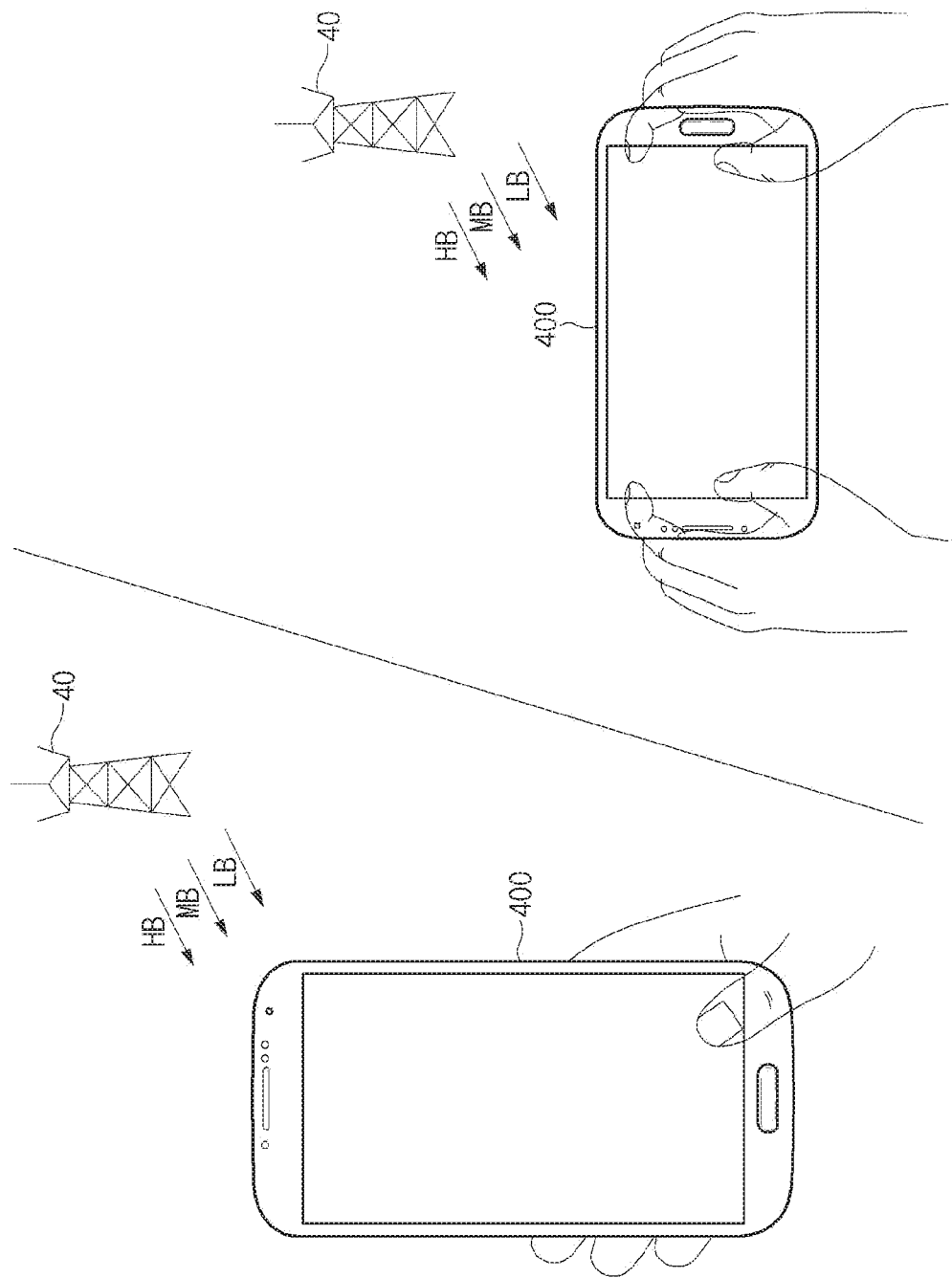
FIG. 3 illustrates an operating environment of an electronic device according to an embodiment.

FIG. 3 illustrates an operating environment of an electronic device according to an embodiment.

Referring to FIG. 3, an electronic device 400 according to an embodiment may communicate with an external device 40. An example is illustrated in FIG. 3 as the electronic device 400 is a smartphone, but the disclosure is not limited thereto. For example, the electronic device 400 may be one of various devices, which are able to communicate with the external device 40, such as a tablet PC, a wearable device, or the like. An example is illustrated in FIG. 3 as the external device 40 is a base station, but the disclosure is not limited thereto. For example, the external device 40 may be one of various devices that are able to transmit signals of various frequencies.

According to an embodiment, the electronic device 400 may receive a high band signal (hereinafter referred to as a "HB signal"), a middle band signal (hereinafter referred to as a "MB signal"), and a low band signal (hereinafter referred to as a "LB signal"). For example, the LB may range from about 700 to 900 MHz, the MB may range from about 1.4 to 2.2 GHz, and the HB may range from about 2.3 to 2.7 GHz. However, the disclosure is not limited thereto. For example, the ranges of the LB, MB, and HB may be variously defined. Also, the LB, the MB, and the HB may mean the lowest frequency band, a middle frequency band, and the highest frequency band of the three frequency bands, respectively. In the specification, for example, the LB may be referred to as a "first frequency band", the MB as a "second frequency band", and the HB as a "third frequency band". However, the disclosure is not limited thereto. For example, the first frequency band, the second frequency band, and the third frequency band may mean any other frequency bands that are different from each other.

According to an embodiment, the electronic device 400 may simultaneously receive at least a part of the HB signal, the MB signal, and the LB signal. For example, the electronic device 400 may receive the HB signal, the MB signal, and the LB signal by using at least a part of a plurality of antennas included in the electronic device 400. Antennas that are respectively used to receive the HB signal, the MB signal, and the LB signal may be different. The electronic device 400 may include paths, the number of which is sufficient to transfer the HB signal, the MB signal, and the LB signal received through two or more antennas. Internal components of the electronic device 400 will be described with reference to FIGS. 4 to 9. When the electronic device 400 performs the CA on at least a part of the HB signal, the MB signal, and the LB signal, the electronic device 400 may allocate respective paths appropriate for the HB signal, the MB signal, and the LB signal for the purpose of improving the data throughput. The electronic device 400 may allocate, for example, a path based on a reference signal received power (RSRP), a reference signal received quality (RSRQ), a reference signal received power (RSSI), a signal to interference noise ratio (SINR), and the like. An operation and a method for allocating a path receiving a signal will be described with reference to FIGS. 5, 7, 9, and 10.

According to an embodiment, when a user grip on the electronic device 400 is changed, an indicator of the RSRP, RSRQ, RSSI, SINR, or the like received to the electronic device 400 from the external device 40 may be changed. When the indicator worsens, the data throughput of the electronic device 400 may decrease. According to an embodiment, to prevent the data throughput from decreasing due to the change in the indicator, the electronic device 400 may reallocate respective paths appropriate for the HB signal, the MB signal, and the LB signal, based on the changed indicator. A method for reallocating a path receiving a signal will be described with reference to FIG. 11.

Figure 4:
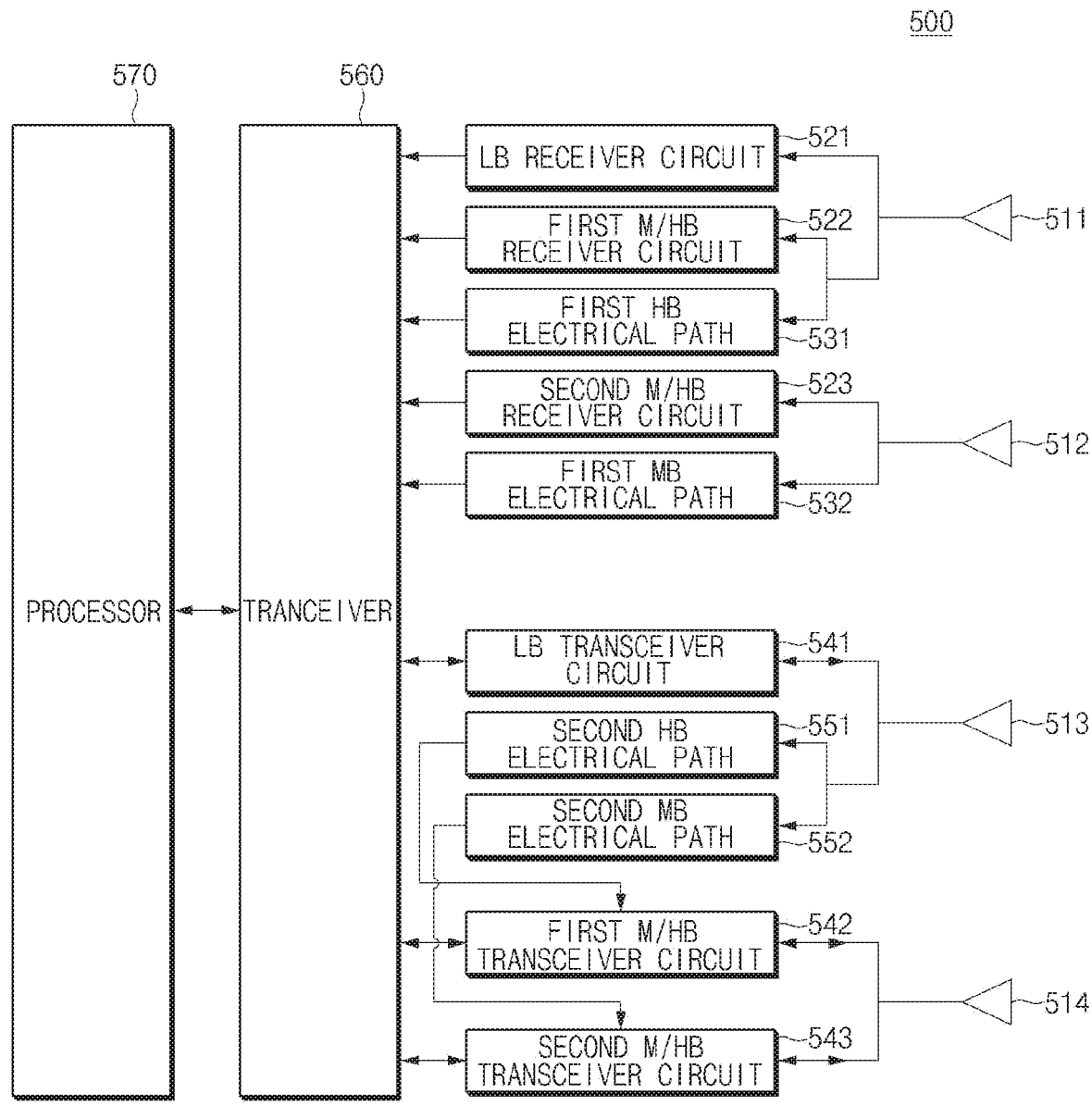
FIG. 4 is a block diagram illustrating a configuration of an electronic device according to an embodiment.

FIG. 4 is a block diagram illustrating a configuration of an electronic device according to an embodiment.

Referring to FIG. 4, an electronic device 500 according to an embodiment may include a first antenna 511, a second antenna 512, a third antenna 513, a fourth antenna 514, an LB receiver circuit 521, a first mid-band/high-band (hereinafter referred to as an "M/HB") receiver circuit 522, a second M/HB receiver circuit 523, a first HB electrical path 531, a first MB electrical path 532, an LB transceiver circuit 541, a first M/HB transceiver circuit 542, a second M/HB transceiver circuit 543, a second HB electrical path 551, a second MB electrical path 552, a transceiver 560, and a processor 570. The electronic device 500 may be a mobile device that a user utilizes. The electronic device 500 may be referred to as a "mobile device", a "mobile terminal", "user equipment (UE)", or the like.

The first antenna 511, the second antenna 512, the third antenna 513, and the fourth antenna 514 may be a multi-band antenna. The first antenna 511 and the second antenna 512 may be a diversity antenna, and the third antenna 513 and the fourth antenna 514 may be a primary antenna. The electronic device 500 may receive signals through the first antenna 511 and the second antenna 512 and may transmit/receive signals through the third antenna 513 and the fourth antenna 514.

The first antenna 511 may be configured to resonate in the LB, the MB, and the HB. The first antenna 511 may receive the LB signal, the MB signal, and/or the HB signal from an external device (e.g., the external device 40 of FIG. 4).

The second antenna 512 may be configured to resonate in the MB and the HB. The second antenna 512 may receive the MB signal and/or the HB signal from the external device.

The third antenna 513 may be configured to resonate in the LB, the MB, and the HB. The third antenna 513 may transmit/receive the LB signal, the MB signal, and/or the HB signal to/from the external device.

The fourth antenna 514 may be configured to resonate in the MB and the HB. The fourth antenna 514 may transmit/receive the MB signal and/or the HB signal to/from the external device.

The LB receiver circuit 521 may receive the LB signal from the first antenna 511. The LB receiver circuit 521 may provide the LB signal received from the first antenna 511 to the transceiver 560. For example, the LB receiver circuit 521 may include an input terminal electrically connected with the first antenna 511 and an output terminal electrically connected with the transceiver 560. The LB receiver circuit 521 may process (e.g., filter or amplify) the LB signal.

The first M/HB receiver circuit 522 may receive the MB signal or the HB signal from the first antenna 511. The first M/HB receiver circuit 522 may provide the MB signal or the HB signal received from the first antenna 511 to the transceiver 560. For example, the first M/HB receiver circuit 522 may include an input terminal electrically connected with the first antenna 511 and an output terminal electrically connected with the transceiver 560. The first M/HB receiver circuit 522 may process the MB signal or the HB signal.

The second M/HB receiver circuit 523 may receive the MB signal or the HB signal from the second antenna 512. The second M/HB receiver circuit 523 may provide the MB signal or the HB signal received from the second antenna 512 to the transceiver 560. For example, the second M/HB receiver circuit 523 may include an input terminal electrically connected with the second antenna 512 and an output terminal electrically connected with the transceiver 560. The second M/HB receiver circuit 523 may process the MB signal or the HB signal.

The LB receiver circuit 521, the first M/HB receiver circuit 522, and the second M/HB receiver circuit 523 may be, for example, a low noise amplifier (LNA) diversity front end module (LFEM) including a front end module (FEM) and an LNA.

The first HB electrical path 531 may receive the HB signal from the first antenna 511. The first HB electrical path 531 may provide the HB signal received from the first antenna 511 to the transceiver 560. For example, one end of the first HB electrical path 531 may be electrically connected with the first antenna 511 and the input terminal of the first M/HB receiver circuit 522. An opposite end of the first HB electrical path 531 may be electrically connected with the transceiver 560. The first HB electrical path 531 may process the HB signal.

The first MB electrical path 532 may receive the MB signal from the second antenna 512. The first MB electrical path 532 may provide the MB signal received from the second antenna 512 to the transceiver 560. For example, one end of the first MB electrical path 532 may be electrically connected with the second antenna 512 and the input terminal of the second M/HB receiver circuit 523. An opposite end of the first MB electrical path 532 may be electrically connected with the transceiver 560. The first MB electrical path 532 may process the MB signal.

According to an embodiment, each of the first HB electrical path 531 and the first MB electrical path 532 may include at least a part of a diplexer, a filter (e.g., a surface acoustic wave (SAW) filter), and an amplifier (e.g., an LNA).

The LB transceiver circuit 541 may receive the LB signal from the third antenna 513. The LB transceiver circuit 541 may provide the LB signal received from the third antenna 513 to the transceiver 560. The LB transceiver circuit 541 may provide the LB signal to the third antenna 513. The LB transceiver circuit 541 may provide the LB signal received from the transceiver 560 to the third antenna 513. For example, the LB transceiver circuit 541 may include an input/output terminal electrically connected with the third antenna 513 and an output terminal electrically connected with the transceiver 560. Also, the LB transceiver circuit 541 may include an input terminal electrically connected with the transceiver 560. The LB transceiver circuit 541 may process (e.g., filter or amplify) the LB signal.

The first M/HB transceiver circuit 542 may receive the MB signal or the HB signal from the fourth antenna 514. The first M/HB transceiver circuit 542 may provide the MB signal or the HB signal received from the fourth antenna 514 to the transceiver 560. The first M/HB transceiver circuit 542 may provide the LB signal to the fourth antenna 514. The first M/HB transceiver circuit 542 may provide the MB signal or the HB signal received from the transceiver 560 to the fourth antenna 514. For example, the first M/HB transceiver circuit 542 may include an input/output terminal electrically connected with the fourth antenna 514 and an output terminal electrically connected with the transceiver 560. Also, the first M/HB transceiver circuit 542 may include an input terminal electrically connected with the transceiver 560. The first M/HB transceiver circuit 542 may process the MB signal or the HB signal.

The second M/HB transceiver circuit 543 may receive the MB signal or the HB signal from the fourth antenna 514. The second M/HB transceiver circuit 543 may provide the MB signal or the HB signal received from the fourth antenna 514 to the transceiver 560. The second M/HB transceiver circuit 543 may provide the MB signal or the HB signal to the fourth antenna 514. The second M/HB transceiver circuit 543 may provide the MB signal or the HB signal received from the transceiver 560 to the fourth antenna 514. For example, the second M/HB transceiver circuit 543 may include an input/output terminal electrically connected with the fourth antenna 514 and an output terminal electrically connected with the transceiver 560. Also, the second M/HB transceiver circuit 543 may include an input terminal electrically connected with the transceiver 560. The second M/HB transceiver circuit 543 may process the MB signal or the HB signal.

The LB transceiver circuit 541, the first M/HB transceiver circuit 542, and the second M/HB transceiver circuit 543 may be, for example, a including a power amplifier and a duplexer.

The second HB electrical path 551 may receive the HB signal from the third antenna 513. The second HB electrical path 551 may provide the HB signal received from the third antenna 513 to the transceiver 560 through the first M/HB transceiver circuit 542. For example, one end of the second HB electrical path 551 may be electrically connected with the third antenna 513. An opposite end of the second HB electrical path 551 may be electrically connected with the first M/HB transceiver circuit 542. For example, the opposite end of the second HB electrical path 551 may be electrically connected with an amplifier (e.g., an LNA) included in the first M/HB transceiver circuit 542. The second HB electrical path 551 may process the HB signal.

The second MB electrical path 552 may receive the MB signal from the third antenna 513. The second MB electrical path 552 may provide the MB signal received from the third antenna 513 to the transceiver 560 through the second M/HB transceiver circuit 543. For example, one end of the second MB electrical path 552 may be electrically connected with the third antenna 513. An opposite end of the second MB electrical path 552 may be electrically connected with the second M/HB transceiver circuit 543. For example, the opposite end of the second MB electrical path 552 may be electrically connected with an amplifier (e.g., an LNA) included in the second M/HB transceiver circuit 543. The second MB electrical path 552 may process the MB signal.

The transceiver 560 may be electrically connected with the LB receiver circuit 521, the first M/HB receiver circuit 522, the second M/HB receiver circuit 523, the first HB electrical path 531, the first MB electrical path 532, the LB transceiver circuit 541, the first M/HB transceiver circuit 542, the second M/HB transceiver circuit 543, the second HB electrical path 551, and the second MB electrical path 552. The transceiver 560 may transmit or receive the LB signal, the MB signal, and the HB signal.

The processor 570 may be electrically connected with the transceiver 560. The processor 570 may receive the LB signal, the MB signal, and the HB signal from the transceiver 560 or may provide the LB signal, the MB signal, and the HB signal to the transceiver 560.

According to an embodiment, the processor 570 may individually enable or disable the LB receiver circuit 521, the first M/HB receiver circuit 522, the second M/HB receiver circuit 523, the first HB electrical path 531, the first MB electrical path 532, the LB transceiver circuit 541, the first M/HB transceiver circuit 542, the second M/HB transceiver circuit 543, the second HB electrical path 551, and the second MB electrical path 552. For example, the processor 570 may individually enable or disable the paths by controlling the on/off of active elements included in the LB receiver circuit 521, the first M/HB receiver circuit 522, the second M/HB receiver circuit 523, the first HB electrical path 531, the first MB electrical path 532, the LB transceiver circuit 541, the first M/HB transceiver circuit 542, the second M/HB transceiver circuit 543, the second HB electrical path 551, and the second MB electrical path 552.

An operation of the electronic device 500 will be described with reference to FIG. 5.

Figure 5:
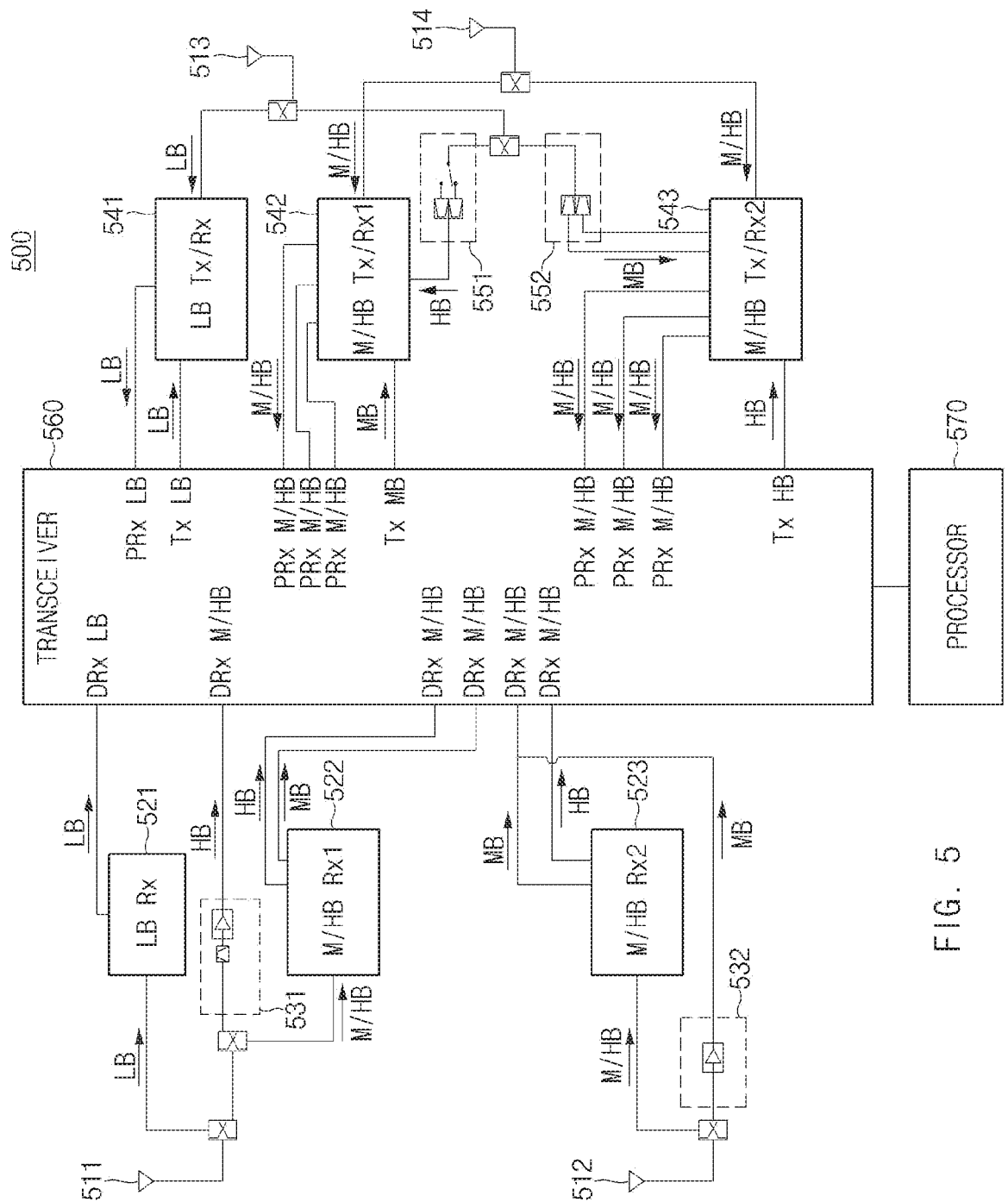
FIG. 5 is a block diagram illustrating a configuration of an electronic device according to an embodiment.

FIG. 5 is a block diagram illustrating a configuration of an electronic device according to an embodiment.

The electronic device 500 illustrated in FIG. 5 may be the same as the electronic device 500 illustrated in FIG. 4.

Referring to FIG. 5, the first antenna 511, the second antenna 512, the third antenna 513, and the fourth antenna 514 may be electrically connected with diplexers, respectively. Signals received by the first antenna 511, the second antenna 512, the third antenna 513, and the fourth antenna 514 may be split by the diplexers.

The first HB electrical path 531 may include, for example, a SAW filter and an LNA. The first HB electrical path 531 and the first M/HB receiver circuit 522 may be branched by the diplexer. The first MB electrical path 532 may include, for example, an LNA. The second HB electrical path 551 may include, for example, a switch and a dual SAW filter. The second MB electrical path 552 may include, for example, a dual SAW filter.

According to an embodiment, the processor 570 may receive respective signals in a plurality of frequency bands through a plurality of paths (multi MIMO). For example, the processor 570 may receive the LB signal from the first antenna 511 through the LB receiver circuit 521 and may receive the LB signal from the third antenna 513 through the LB transceiver circuit 541. The processor 570 may receive the MB signal from the first antenna 511 through the first M/HB receiver circuit 522, may receive the MB signal from the second antenna 512 through the first MB electrical path 532, may receive the MB signal from the third antenna 513 through the second MB electrical path 552, and may receive the MB signal from the fourth antenna 514 through the first M/HB transceiver circuit 542 (or the second M/HB transceiver circuit 543). The processor 570 may receive the HB signal from the first antenna 511 through the first HB electrical path 531, may receive the HB signal from the second antenna 512 through the second M/HB receiver circuit 523, may receive the HB signal from the third antenna 513 through the second HB electrical path 551, and may receive the HB signal from the fourth antenna 514 through the second M/HB transceiver circuit 543 (or the first M/HB transceiver circuit 542).

That is, the processor 570 may simultaneously receive the LB signals through two paths, may simultaneously receive the MB signals through four paths, and may simultaneously receive the HB signals through four paths. By adopting additional electrical paths such as the first HB electrical path 531, the first MB electrical path 532, the second HB electrical path 551, and the second MB electrical path 552, the electronic device 500 according to an embodiment may support the multi MIMO for simultaneously receiving the MB signals through four paths and the HB signals through four different paths.

According to an embodiment, the processor 570 may perform the CA on signals in a plurality of frequency bands. The processor 570 may allocate a path (e.g., the LB receiver circuit 521, the first M/HB receiver circuit 522, the second M/HB receiver circuit 523, the first HB electrical path 531, the first MB electrical path 532, the LB transceiver circuit 541, the first M/HB transceiver circuit 542, the second M/HB transceiver circuit 543, the second HB electrical path 551, or the second MB electrical path 552) to each of signals in a plurality of frequency bands.

According to an embodiment, the processor 570 may receive the MB signal and the HB signal from the external device through the first antenna 511 and the second antenna 512. For example, the processor 570 may receive the MB signal through the first antenna 511 and may receive the HB signal through the second antenna 512. The processor 570 may receive the HB signal through the first antenna 511 and may receive the MB signal through the second antenna 512. For example, the MB signal may be provided to the transceiver 560 through the first M/HB receiver circuit 522, the second M/HB receiver circuit 523, or the first MB electrical path 532. For example, the HB signal may be provided to the transceiver 560 through the first HB electrical path 531, the first M/HB receiver circuit 522, or the second M/HB receiver circuit 523.

According to an embodiment, the processor 570 may compare a bandwidth of the MB signal and a bandwidth of the HB signal. The processor 570 may recognize a signal, which has a wider bandwidth, from among the MB signal and the HB signal by comparing bandwidths.

According to an embodiment, the processor 570 may receive an indicator associated with receiving the MB signal and the HB signal from the external device that transmits signals to the first antenna 511 and the second antenna 512. For example, the indicator may include at least a part of the RSRP, the RSRQ, the RSSI, and the SINR. For example, the processor 570 may obtain an indicator corresponding to the case where the MB signal is received through the first M/HB receiver circuit 522, an indicator corresponding to the case where the MB signal is received through the second M/HB receiver circuit 523, and an indicator corresponding to the case where the MB signal is received through the first MB electrical path 532. The processor 570 may obtain an indicator corresponding to the case where the HB signal is received through the first HB electrical path 531, an indicator corresponding to the case where the HB signal is received through the first M/HB receiver circuit 522, and an indicator corresponding to the case where the HB signal is received through the second M/HB receiver circuit 523.

According to an embodiment, based on indicators respectively associated with receiving the MB signal and the HB signal, the processor 570 may allocate one available path among the first M/HB receiver circuit 522, the second M/HB receiver circuit 523, the first HB electrical path 531, and the first MB electrical path 532 sequentially from a signal having a wider bandwidth from among the MB signal and the HB signal. According to an embodiment, the processor 570 may allocate one available path among the first M/HB receiver circuit 522, the second M/HB receiver circuit 523, the first HB electrical path 531, and the first MB electrical path 532 to a signal having a wider bandwidth from among the MB signal and the HB signal and may allocate one available path among unallocated paths to a signal having a narrower bandwidth from among the MB signal and the HB signal. The data throughput may be improved by first allocating a path to a wider bandwidth.

For example, when the bandwidth of the MB signal is wider than the bandwidth of the HB signal, the processor 570 may first allocate one path among the first M/HB receiver circuit 522, the second M/HB receiver circuit 523, and the first MB electrical path 532 to the MB signal. In this case, because the first HB electrical path 531 fails to receive the MB signal, the first HB electrical path 531 may be excluded from available paths. The processor 570 may allocate a path, which provides the most excellent path when the MB signal is received, from among the first M/HB receiver circuit 522, the second M/HB receiver circuit 523, and the first MB electrical path 532 to the MB signal.

For example, in the case where the first M/HB receiver circuit 522 is allocated to the MB signal, next, the processor 570 may allocate one path of the first HB electrical path 531 and the second M/HB receiver circuit 523 being unallocated paths to the HB signal. In this case, because the first MB electrical path 532 fails to receive the HB signal, the first MB electrical path 532 may be excluded from available paths. The processor 570 may allocate a path, which provides the most excellent path when the HB signal is received, from among the first HB electrical path 531 and the second M/HB receiver circuit 523 to the HB signal. The processor 570 may allocate, for example, the second M/HB receiver circuit 523 to the HB signal.

According to an embodiment, the processor 570 may receive the MB signal and the HB signal through the allocated paths, respectively. For example, the processor 570 may receive the MB signal through the first M/HB receiver circuit 522 and may receive the HB signal through the second M/HB receiver circuit 523. The processor 570 may enable an allocated path among the first M/HB receiver circuit 522, the second M/HB receiver circuit 523, the first HB electrical path 531, and the first MB electrical path 532 and may disable unallocated paths among the first M/HB receiver circuit 522, the second M/HB receiver circuit 523, the first HB electrical path 531, and the first MB electrical path 532. For example, the processor 570 may enable the first M/HB receiver circuit 522 and the second M/HB receiver circuit 523 and may disable the first HB electrical path 531 and the first MB electrical path 532. The processor 570 may receive the MB signal and the HB signal from antennas electrically connected with the allocated paths.

According to an embodiment, when the MB signal and the HB signal are received through the allocated paths, the processor 570 may aggregate the MB signal and the HB signal.

According to an embodiment, when an indicator is changed as much as a specified range or greater, based on the changed indicator, the processor 570 may reallocate one available path among the first M/HB receiver circuit 522, the second M/HB receiver circuit 523, the first HB electrical path 531, and the first MB electrical path 532 sequentially from a signal having a wider bandwidth from among the MB signal and the HB signal.

According to an embodiment, when the MB signal and the HB signal are received through the third antenna 513 and the fourth antenna 514, based on indicators respectively associated with receiving the MB signal and the HB signal, the processor 570 may allocate one available path among the first M/HB transceiver circuit 542, the second M/HB transceiver circuit 543, the second HB electrical path 551, and the second MB electrical path 552 sequentially from a signal having a wider bandwidth from among the MB signal and the HB signal. The processor 570 may allocate the MB signal and the HB signal received through the third antenna 513 and the fourth antenna 514 in a way that is similar to the way to allocate paths to the MB signal and the HB signal received through the first antenna 511 and the second antenna 512.

Figure 6:
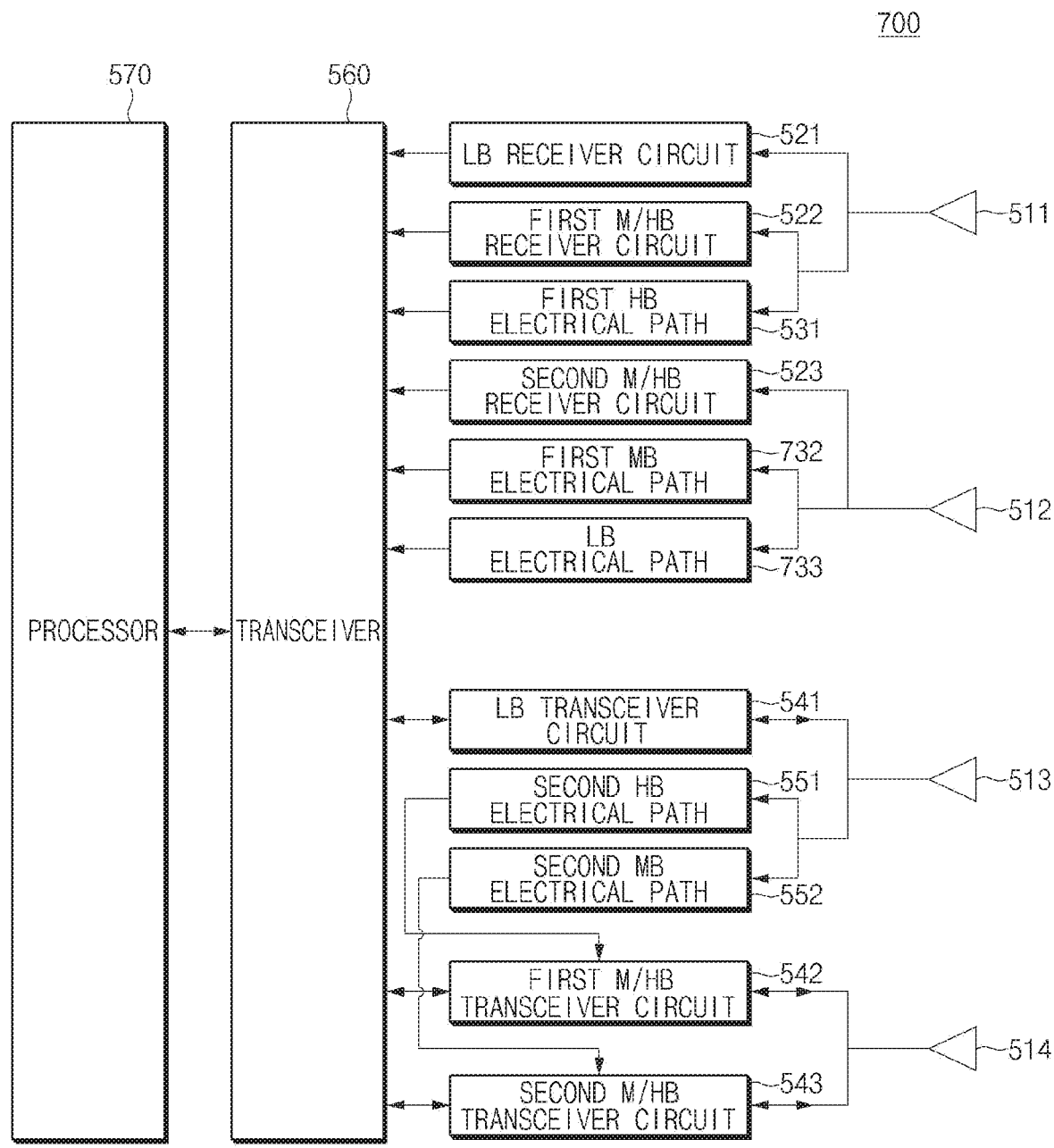
FIG. 6 is a block diagram illustrating a configuration of an electronic device according to an embodiment.

FIG. 6 is a block diagram illustrating a configuration of an electronic device according to an embodiment.

Referring to FIG. 6, an electronic device 700 according to an embodiment may include the first antenna 511, the second antenna 512, the third antenna 513, the fourth antenna 514, the LB receiver circuit 521, the first M/HB receiver circuit 522, the second M/HB receiver circuit 523, the first HB electrical path 531, a first MB electrical path 732, an LB electrical path 733, the LB transceiver circuit, the first M/HB transceiver circuit 542, the second M/HB transceiver circuit 543, the second HB electrical path 551, the second MB electrical path 552, the transceiver 560, and the processor 570. The electronic device 700 may be a mobile device that a user utilizes. The electronic device 700 may be referred to as a "mobile device", a "mobile terminal", "user equipment", or the like. For convenience of description, with regard to the configurations and the operations described with reference to FIG. 4, additional description will be omitted to avoid redundancy.

The first MB electrical path 732 may receive the MB signal from the second antenna 512. The first MB electrical path 732 may provide the MB signal received from the second antenna 512 to the transceiver 560. For example, one end of the first MB electrical path 732 may be electrically connected with the second antenna 512, the input terminal of the second M/HB receiver circuit 523, and one end of the LB electrical path 733. An opposite end of the first MB electrical path 732 may be electrically connected with the transceiver 560. The first MB electrical path 732 may process the MB signal.

The LB electrical path 733 may receive the LB signal from the second antenna 512. According to an embodiment, the second antenna 512 may be configured to resonate in the LB, the MB, and the HB. The LB electrical path 733 may provide the LB signal received from the second antenna 512 to the transceiver 560. For example, one end of the LB electrical path 733 may be electrically connected with the second antenna 512, the input terminal of the second M/HB receiver circuit 523, and the one end of the first MB electrical path 732. An opposite end of the LB electrical path 733 may be electrically connected with the transceiver 560. The LB electrical path 733 may process the LB signal.

According to an embodiment, the processor 570 may individually enable or disable the LB receiver circuit 521, the first M/HB receiver circuit 522, the second M/HB receiver circuit 523, the first HB electrical path 531, the first MB electrical path 732, the LB electrical path 733, the LB transceiver circuit, the first M/HB transceiver circuit 542, the second M/HB transceiver circuit 543, the second HB electrical path 551, and the second MB electrical path 552.

An operation of the electronic device 700 will be described with reference to FIG. 7.

Figure 7:
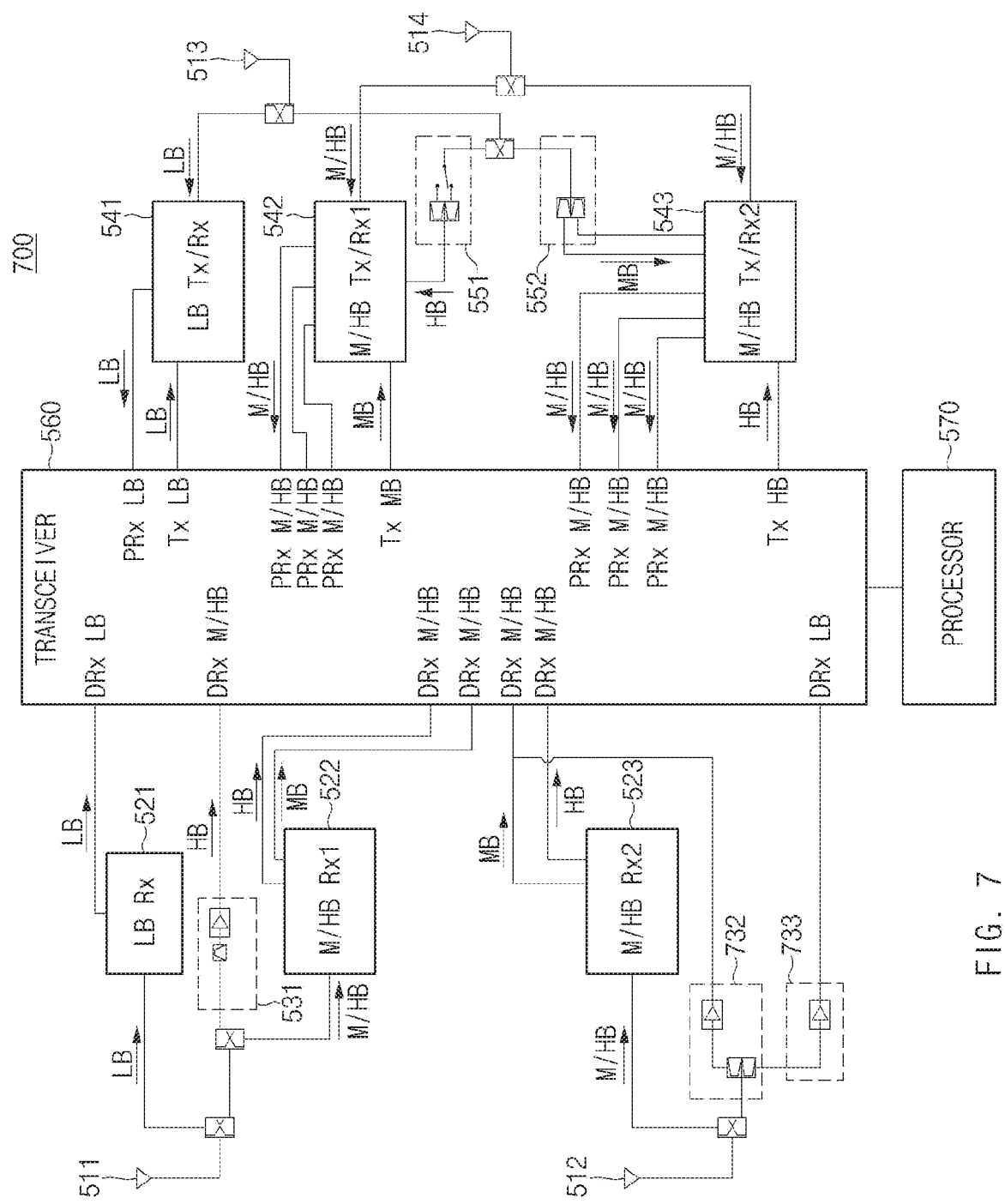
FIG. 7 is a block diagram illustrating a configuration of an electronic device according to an embodiment.

FIG. 7 is a block diagram illustrating a configuration of an electronic device according to an embodiment.

The electronic device 700 illustrated in FIG. 7 may be the same as the electronic device 700 illustrated in FIG. 6. For convenience of description, with regard to the configurations and the operations described with reference to FIG. 5, additional description will be omitted to avoid redundancy.

Referring to FIG. 7, the first MB electrical path 732 may include, for example, a dual SAW filter and an LNA. The LB electrical path 733 may include, for example, an LNA. The first MB electrical path 732 and the LB electrical path 733 may be branched by the dual SAW filter.

According to an embodiment, the processor 570 may receive respective signals in a plurality of frequency bands through a plurality of paths (multi MIMO). For example, the processor 570 may receive the LB signal through the LB receiver circuit 521, the LB electrical path 733, and the LB transceiver circuit. The processor 570 may receive the MB signals through the first M/HB receiver circuit 522, the first MB electrical path 732, the second MB electrical path 552, and the first M/HB transceiver circuit 542 (or the second M/HB transceiver circuit 543). The processor 570 may receive the HB signals through the first HB electrical path 531, the second M/HB receiver circuit 523, the second HB electrical path 551, and the second M/HB transceiver circuit 543 (or the first M/HB transceiver circuit 542).

According to an embodiment, the processor 570 may perform the CA on signals in a plurality of frequency bands. The processor 570 may allocate a path (e.g., the LB receiver circuit 521, the first M/HB receiver circuit 522, the second M/HB receiver circuit 523, the first HB electrical path 531, the first MB electrical path 732, the LB electrical path 733, the LB transceiver circuit, the first M/HB transceiver circuit 542, the second M/HB transceiver circuit 543, the second HB electrical path 551, or the second MB electrical path 552) to each of signals in a plurality of frequency bands.

According to an embodiment, when the LB signal, the MB signal, and the HB signal are received through the first antenna 511 and the second antenna 512 from the external device, based on indicators respectively associated with receiving the LB signal, the MB signal, and the HB signal, the processor 570 may allocate one available path among the LB receiver circuit 521, the first M/HB receiver circuit 522, the second M/HB receiver circuit 523, the first HB electrical path 531, the first MB electrical path 732, and the LB electrical path 733 sequentially from a signal having a wider bandwidth from among the LB signal, the MB signal, and the HB signal. As in the way described with reference to FIG. 5, the processor 570 may allocate paths to the LB signal, the MB signal, and the HB signal.

Figure 8:
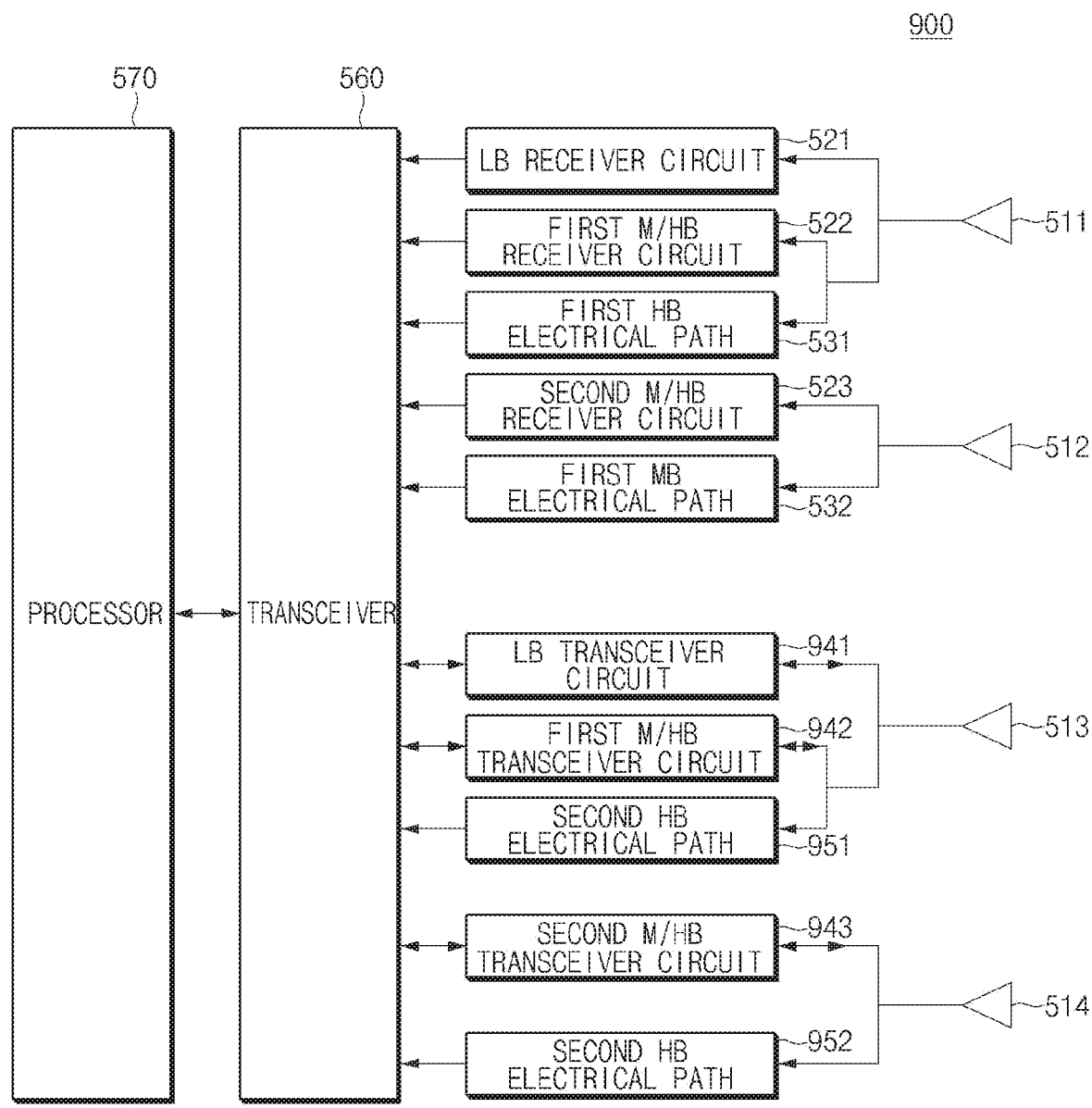
FIG. 8 is a block diagram illustrating a configuration of an electronic device according to an embodiment.

FIG. 8 is a block diagram illustrating a configuration of an electronic device according to an embodiment.

Referring to FIG. 8, an electronic device 900 according to an embodiment may include the first antenna 511, the second antenna 512, the third antenna 513, the fourth antenna 514, the LB receiver circuit 521, the first M/HB receiver circuit 522, the second M/HB receiver circuit 523, the first HB electrical path 531, the first MB electrical path 532, an LB transceiver circuit 941, a first M/HB transceiver circuit 942, a second M/HB transceiver circuit 943, a second HB electrical path 951, a second MB electrical path 952, the transceiver 560, and the processor 570. The electronic device 900 may be a mobile device that a user utilizes. The electronic device 900 may be referred to as a "mobile device", a "mobile terminal", "user equipment", or the like. For convenience of description, with regard to the configurations and the operations described with reference to FIG. 4, additional description will be omitted to avoid redundancy.

The LB transceiver circuit 941 may receive the LB signal from the third antenna 513. The LB transceiver circuit 941 may provide the LB signal received from the third antenna 513 to the transceiver 560. The LB transceiver circuit 941 may provide the LB signal to the third antenna 513. The LB transceiver circuit 941 may provide the LB signal received from the transceiver 560 to the third antenna 513. For example, the LB transceiver circuit 941 may include an input/output terminal electrically connected with the third antenna 513 and an output terminal electrically connected with the transceiver 560. Also, the LB transceiver circuit 941 may include an input terminal electrically connected with the transceiver 560. The LB transceiver circuit 941 may process the LB signal.

The first M/HB transceiver circuit 942 may receive the MB signal or the HB signal from the third antenna 513. The first M/HB transceiver circuit 942 may provide the MB signal or the HB signal received from the third antenna 513 to the transceiver 560. The first M/HB transceiver circuit 942 may provide the LB signal to the third antenna 513. The first M/HB transceiver circuit 942 may provide the MB signal or the HB signal received from the transceiver 560 to the third antenna 513. For example, the first M/HB transceiver circuit 942 may include an input/output terminal electrically connected with the third antenna 513 and an output terminal electrically connected with the transceiver 560. Also, the first M/HB transceiver circuit 942 may include an input terminal electrically connected with the transceiver 560. The first M/HB transceiver circuit 942 may process the MB signal or the HB signal.

The second M/HB transceiver circuit 943 may receive the MB signal or the HB signal from the fourth antenna 514. The second M/HB transceiver circuit 943 may provide the MB signal or the HB signal received from the fourth antenna 514 to the transceiver 560. The second M/HB transceiver circuit 943 may provide the MB signal or the HB signal to the fourth antenna 514. The second M/HB transceiver circuit 943 may provide the MB signal or the HB signal received from the transceiver 560 to the fourth antenna 514. For example, the second M/HB transceiver circuit 943 may include an input/output terminal electrically connected with the fourth antenna 514 and an output terminal electrically connected with the transceiver 560. Also, the second M/HB transceiver circuit 943 may include an input terminal electrically connected with the transceiver 560. The second M/HB transceiver circuit 943 may process the MB signal or the HB signal.

The LB transceiver circuit 941, the first M/HB transceiver circuit 942, and the second M/HB transceiver circuit 943 may be, for example, a PAMiD including a power amplifier and a duplexer.

The second HB electrical path 951 may receive the HB signal from the third antenna 513. The second HB electrical path 951 may provide the HB signal received from the third antenna 513 to the transceiver 560. For example, one end of the second HB electrical path 951 may be electrically connected with the third antenna 513 and the input terminal of the first M/HB transceiver circuit 942. An opposite end of the second HB electrical path 951 may be electrically connected with the transceiver 560. The second HB electrical path 951 may process the HB signal.

The second MB electrical path 952 may receive the MB signal from the fourth antenna 514. The second MB electrical path 952 may provide the MB signal received from the fourth antenna 514 to the transceiver 560. For example, one end of the second MB electrical path 952 may be electrically connected with the fourth antenna 514 and the input terminal of the second M/HB transceiver circuit 943. An opposite end of the second MB electrical path 952 may be electrically connected with the transceiver 560. The second MB electrical path 952 may process the MB signal.

The layout of the LB transceiver circuit 941, the first M/HB transceiver circuit 942, the second M/HB transceiver circuit 943, the second HB electrical path 951, and the second MB electrical path 952 may be similar to the layout of the LB receiver circuit 521, the first M/HB receiver circuit 522, the second M/HB receiver circuit 523, the first HB electrical path 531, and the first MB electrical path 532.

According to an embodiment, the processor 570 may individually enable or disable the LB receiver circuit 521, the first M/HB receiver circuit 522, the second M/HB receiver circuit 523, the first HB electrical path 531, the first MB electrical path 532, the LB transceiver circuit 941, the first M/HB transceiver circuit 942, the second M/HB transceiver circuit 943, the second HB electrical path 951, and the second MB electrical path 952.

Figure 9:
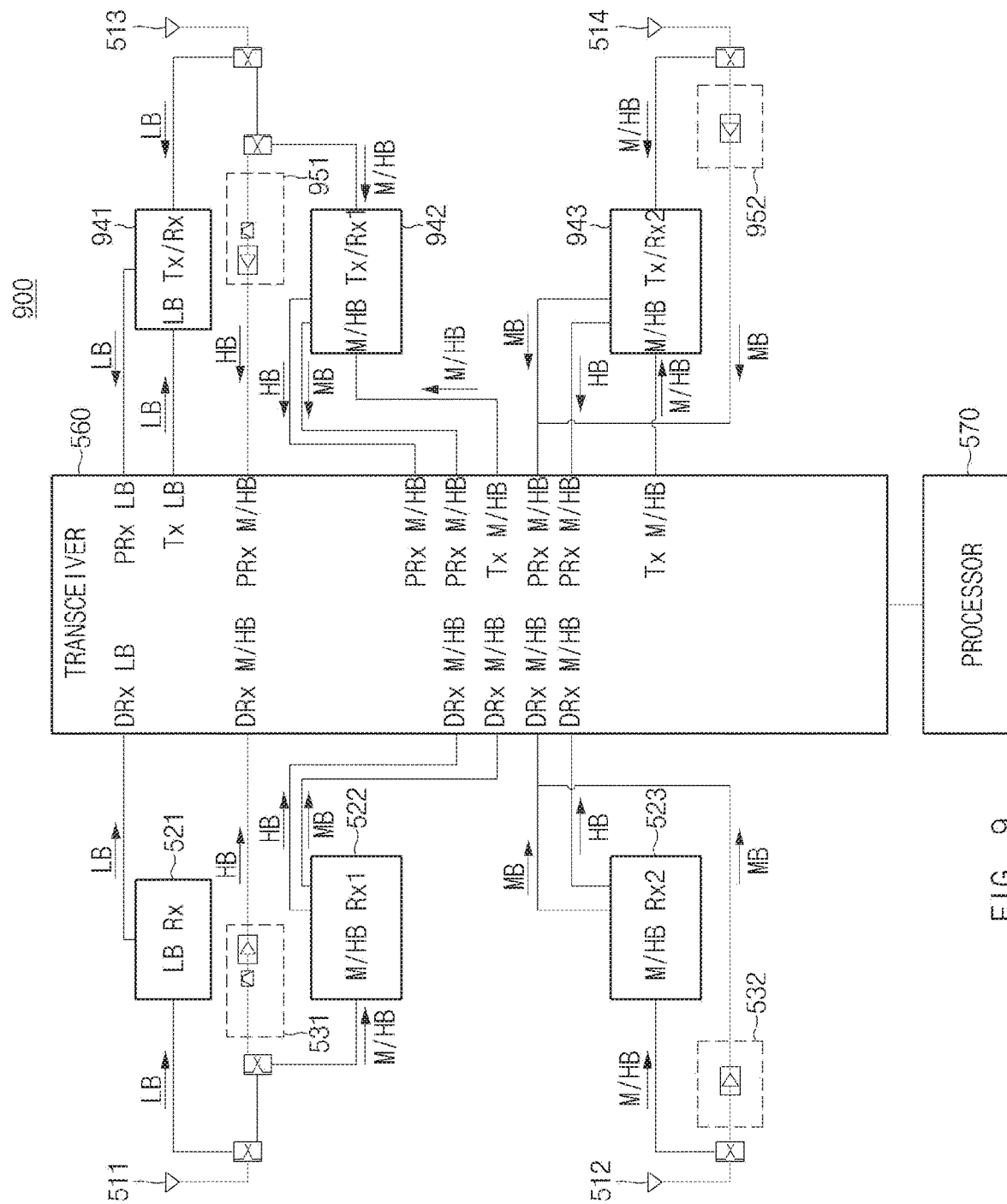
FIG. 9 is a block diagram illustrating a configuration of an electronic device according to an embodiment.

FIG. 9 is a block diagram illustrating a configuration of an electronic device according to an embodiment.

The electronic device 900 illustrated in FIG. 9 may be the same as the electronic device 900 illustrated in FIG. 8. For convenience of description, with regard to the configurations and the operations described with reference to FIG. 5, additional description will be omitted to avoid redundancy.

Referring to FIG. 9, the second HB electrical path 951 may include, for example, a SAW filter and an LNA. The second HB electrical path 951 may be implemented to be similar to the first HB electrical path 531. The second MB electrical path 952 may include, for example, an LNA. The second MB electrical path 952 may be implemented to be similar to the first MB electrical path 532.

According to an embodiment, the processor 570 may receive respective signals in a plurality of frequency bands through a plurality of paths (multi MIMO). For example, the processor 570 may receive the LB signals through the LB receiver circuit 521 and the LB transceiver circuit 941. The processor 570 may receive the MB signals through the first M/HB receiver circuit 522, the first MB electrical path 532, the first M/HB transceiver circuit 942, and the second MB electrical path 952. The processor 570 may receive the HB signals through the first HB electrical path 531, the second M/HB receiver circuit 523, the second HB electrical path 951, and the second M/HB transceiver circuit 943.

According to an embodiment, the processor 570 may perform the CA on signals in a plurality of frequency bands. The transceiver 570 may allocate a path (e.g., the LB receiver circuit 521, the first M/HB receiver circuit 522, the second M/HB receiver circuit 523, the first HB electrical path 531, the first MB electrical path 532, the LB transceiver circuit 941, the first M/HB transceiver circuit 942, the second M/HB transceiver circuit 943, the second HB electrical path 951, or the second MB electrical path 952) to each of signals in a plurality of frequency bands.

According to an embodiment, when the LB signal, the MB signal, and the HB signal are received through the third antenna 513 and the fourth antenna 514 from the external device, based on indicators respectively associated with receiving the LB signal, the MB signal, and the HB signal, the processor 570 may allocate one available path among the LB transceiver circuit 941, the first M/HB transceiver circuit 942, the second M/HB transceiver circuit 943, the second HB electrical path 951, and the second MB electrical path 952 sequentially from a signal having a wider bandwidth from among to the LB signal, the MB signal, and the HB signal. As in the way described with reference to FIG. 6, the processor 570 may allocate paths to the LB signal, the MB signal, and the HB signal.

Figure 10:
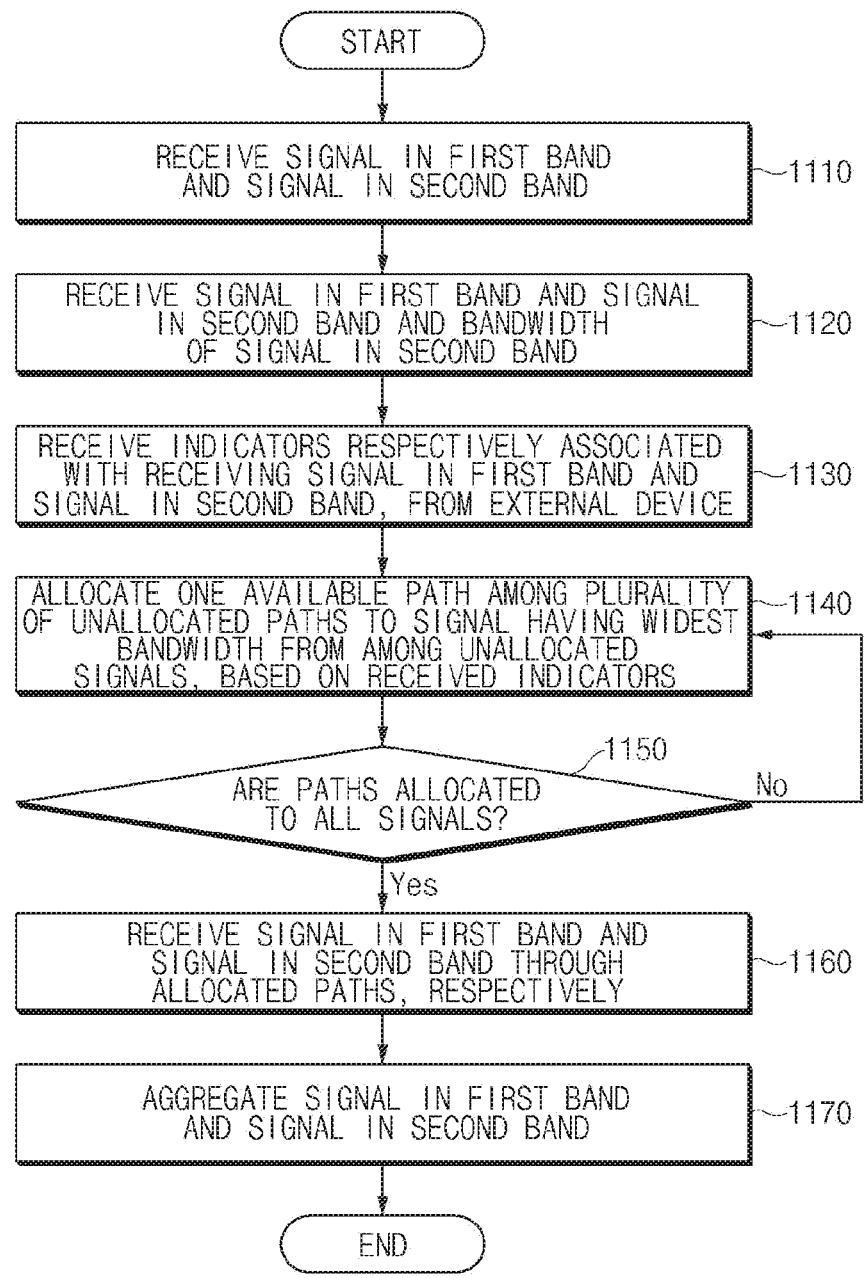
FIG. 10 is a flowchart for describing a method for determining a communication signal receiving path of an electronic device, according to an embodiment.

FIG. 10 is a flowchart for describing a method for determining a communication signal receiving path of an electronic device, according to an embodiment.

Below, it is assumed that the electronic device 500 FIGS. 4 and 5, the electronic device 700 of FIGS. 6 and 7, and the electronic device 900 of FIGS. 8 and 9 perform the process of FIG. 10. In addition, in the description of FIG. 10, it may be understood that operations described as being performed by the electronic device are controlled by the processor 570.

Referring to FIG. 10, in operation 1110, the electronic device may receive a signal in a first band and a signal in a second band. For example, the electronic device may receive the signal in the first band and the second in the second band through one or more antennas from an external device such as a base station. Here, the signal in the first band may be, for example, the MB signal, and the signal in the second band may be, for example, the HB signal. An example is illustrated in FIG. 10 as the electronic device receives signals in two bands, but the disclosure is not limited thereto. For example, the electronic device may receive signals in three or more bands. When signals in three or more bands are received, the electronic device may perform the following operation on the signals in the three or more signals.

In operation 1120, the electronic device may compare a bandwidth of the signal in the first band and a bandwidth of the signal in the second band. For example, when the electronic device receives the MB signal and the HB signal, the electronic device may compare a bandwidth of the MB signal and a bandwidth of the HB signal. The electronic device may recognize a signal having a greater bandwidth from among the MB signal and the HB signal.

In operation 1130, the electronic device may receive indicators respectively associated with receiving the signal in the first band and the signal in the second band, from an external device. For example, when the electronic device is able to receive the MB signals through a first path, a second path, and a third path, the electronic device may obtain the RSSI of the MB signal when received through the first path, the RSSI of the MB signal when received through the second path, and the RSSI of the MB signal when received through the third path, from the external device. As in the above description, when the electronic device is able to receive the HB signal through the first path, the second path, and a fourth path, the electronic device may obtain the RSSI of the HB signal when received through the first path, the RSSI of the HB signal when received through the second path, and the RSSI of the HB signal when received through the third path, from the external device.

In operation 1140, the electronic device may allocate one available path among a plurality of unallocated paths to a signal having the widest bandwidth from among unallocated signals, based on the received indicators. For example, when the bandwidth of the HB signal is wider than the bandwidth of the LB signal, the electronic device may allocate a path having the highest RSSI from among the first path, the second path, and the fourth path to the HB signal.

In operation 1150, the electronic device may determine whether paths are allocated to all the signals. When paths are not allocated to all the signals, the electronic device may again perform operation 1140. For example, when the first path is allocated to the HB signal, the electronic device may allocate a path having the highest RSSI from among the second path and the third path to the LB signal.

When paths are allocated to all the signals, in operation 1150, the electronic device may receive the signal in the first band and the signal in the second band through the allocated paths, respectively. For example, the electronic device may receive the HB signal through the first path and may receive the LB signal through the second path.

In operation 1160, the electronic device may aggregate the signal in the first band and the signal in the second band. For example, the electronic device may perform the CA on the signal in the first band and the signal in the second band.

Figure 11:
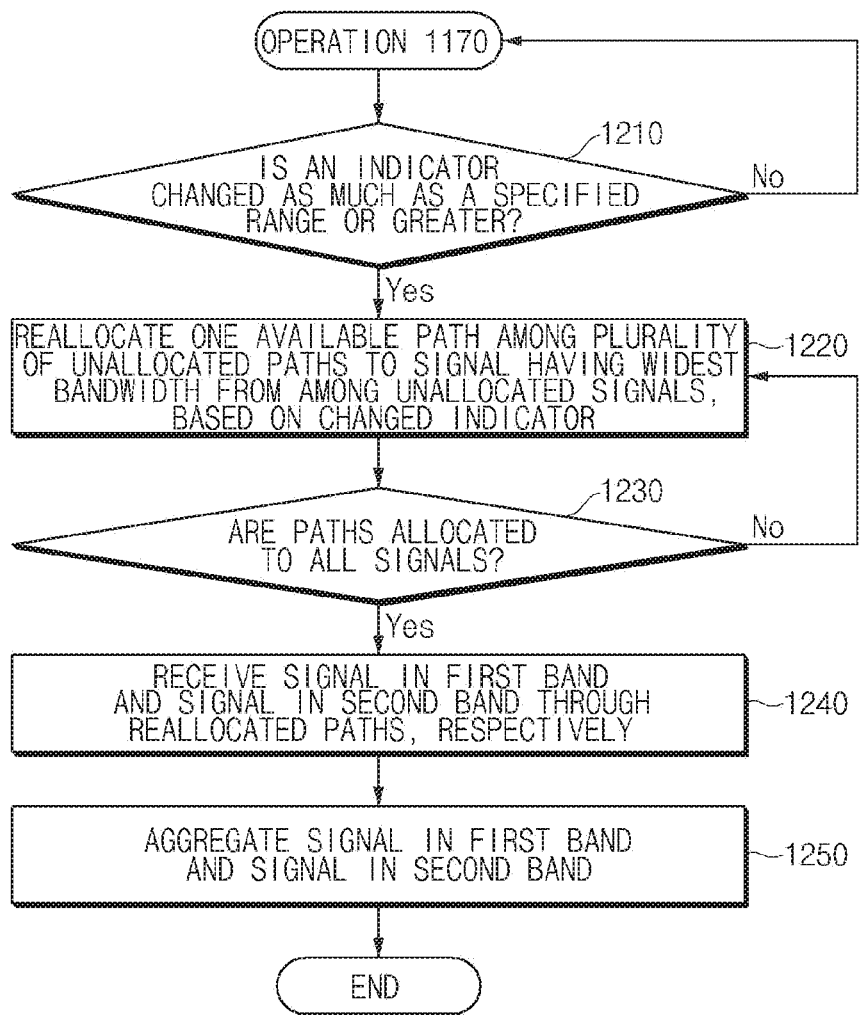
FIG. 11 is a flowchart for describing a method for determining a communication signal receiving path of an electronic device, according to an embodiment.

FIG. 11 is a flowchart for describing a method for determining a communication signal receiving path of an electronic device, according to an embodiment.

Below, it is assumed that the electronic device 500 FIGS. 4 and 5, the electronic device 700 of FIGS. 6 and 7, and the electronic device 900 of FIGS. 8 and 9 perform the process of FIG. 11. In addition, in the description of FIG. 11, it may be understood that operations described as being performed by the electronic device are controlled by the processor 570. With regard to the operations described with reference to FIG. 10, additional description will be omitted to avoid redundancy.

Referring to FIG. 11, after operation 1170 is performed, in operation 1210, the electronic device may determine whether an indicator is changed as much as a specified range or greater. For example, the electronic device may receive the RSSI from the external device periodically or whenever a specified event occurs. The electronic device may determine whether the RSSI is changed as much as a specified range (e.g., ±6 dB) or greater. The specified range may be changed based on the remaining quantity of a battery or may be changed depending on settings of a user. As the specified range becomes smaller, the data throughput may be improved, and power consumption may be increased. When the indicator is not changed as much as the specified range or greater, the electronic device may perform operation 1170.

When the indicator is changed as much as the specified range or greater, in operation 1220, the electronic device may reallocate one available path among a plurality of unallocated paths to a signal having the widest bandwidth from among unallocated signals, based on the changed indicator. For example, as in operation 1140, the electronic device may reallocate a path.

In operation 1230, the electronic device may determine whether paths are reallocated to all the signals. When paths are not allocated to all the signals, the electronic device may again perform operation 1220.

When paths are allocated to all the signals, in operation 1240, the electronic device may receive the signal in the first band and the signal in the second band through the reallocated paths, respectively.

In operation 1250, the electronic device may aggregate the signal in the first band and the signal in the second band.

The term "module" used in this disclosure may include a unit composed of hardware, software and firmware and may be interchangeably used with the terms "unit", "logic", "logical block", "part" and "circuit". The "module" may be an integrated part or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 130) in the form of a program module. The instruction, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, the one or more instructions may contain a code made by a compiler or a code executable by an interpreter. A module or a program module according to various embodiments may include at least one of the above components, or a part of the above components may be omitted, or other components may be further included. Operations performed by a module, a program module, or other components according to various embodiments may be executed sequentially, in parallel, repeatedly, or in a heuristic method or some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first antenna configured to resonate in a first band, a second band, and a third band;
a second antenna configured to resonate in the second band and the third band;
a transceiver configured to transmit or receive a signal in the first band, a signal in the second band, and a signal in the third band;
a first RF circuit configured to receive the signal in the second band or the signal in the third band from the first antenna and to provide the signal in the second band or the signal in the third band to the transceiver;
a second RF circuit configured to receive the signal in the second band or the signal in the third band from the second antenna and to provide the signal in the second band or the signal in the third band to the transceiver;
a first electrical path configured to receive the signal in the third band from the first antenna and to provide the signal in the third band to the transceiver;
a second electrical path configured to receive the signal in the second band from the second antenna and to provide the signal in the second band to the transceiver; and
a processor electrically connected with the transceiver, wherein the processor is configured to:
allocate one available path among the first RF circuit, the second RF circuit, the first electrical path, and the second electrical path sequentially from a signal having a wider bandwidth from among the signal in the second band and the signal in the third band based on indicators respectively associated with receiving the signal in the second band and the signal in the third band, when the signal in the second band and the signal in the third band are received through the first antenna and the second antenna; and
receive the signal in the second band and the signal in the third band through the allocated paths, respectively.

2. The electronic device of claim 1, wherein the processor is configured to:
compare a bandwidth of the signal in the second band and a bandwidth of the signal in the third band; and
obtain an indicator from an external device transmitting a signal to the first antenna and the second antenna.

3. The electronic device of claim 1, wherein the indicators include at least a part of a reference signal received power (RSRP), a reference signal received quality (RSRQ), a reference signal received power (RSSI), and a signal to interference noise ratio (SINR).

4. The electronic device of claim 1, wherein the processor is configured to:
allocate one available path among the first RF circuit, the second RF circuit, the first electrical path, and the second electrical path to a signal having a wider bandwidth from among the signal in the second band and the signal in the third band; and
allocate one available path among unallocated paths to a signal having a narrower bandwidth from among the signal in the second band and the signal in the third band.

5. The electronic device of claim 1, wherein the processor is configured to:
when an indicator among the indicators is changed, reallocate one available path among the first RF circuit, the second RF circuit, the first electrical path, and the second electrical path sequentially from a signal having a wider bandwidth from among the signal in the second band and the signal in the third band, based on the changed indicator.

6. The electronic device of claim 1, wherein the processor is configured to:
aggregate the signal in the second band and the signal in the third band when the signal in the second band and the signal in the third band are received through the allocated path.

7. The electronic device of claim 1, wherein the processor is configured to:
enable the allocated path among the first RF circuit, the second RF circuit, the first electrical path, and the second electrical path; and
disable an unallocated path among the first RF circuit, the second RF circuit, the first electrical path, and the second electrical path.

8. The electronic device of claim 1, further comprising:
a third antenna configured to resonate in the first band, the second band, and the third band;
a fourth antenna configured to resonate in the second band and the third band;
a third RF circuit configured to receive the signal in the second band or the signal in the third band from the fourth antenna and to provide the signal in the second band or the signal in the third band to the transceiver;
a fourth RF circuit configured to receive the signal in the second band or the signal in the third band from the fourth antenna and to provide the signal in the second band or the signal in the third band to the transceiver;
a third electrical path configured to receive the signal in the third band from the third antenna and to provide the signal in the third band to the third RF circuit; and
a fourth electrical path configured to receive the signal in the second band from the third antenna and to provide the signal in the second band to the third RF circuit,
wherein the processor is configured to:
allocate one available path among the third RF circuit, the fourth RF circuit, the third electrical path, and the fourth electrical path sequentially from a signal having a wider bandwidth from among the signal in the second band and the signal in the third band based on indicators respectively associated with receiving the signal in the second band and the signal in the third band, when the signal in the second band and the signal in the third band are received through the third antenna and the fourth antenna.

9. The electronic device of claim 1, further comprising:
a third antenna configured to resonate in the first band, the second band, and the third band;
a fourth antenna configured to resonate in the second band and the third band;
a third RF circuit configured to receive the signal in the second band or the signal in the third band from the third antenna and to provide the signal in the second band or the signal in the third band to the transceiver;
a fourth RF circuit configured to receive the signal in the second band or the signal in the third band from the fourth antenna and to provide the signal in the second band or the signal in the third band to the transceiver;
a third electrical path configured to receive the signal in the third band from the third antenna and to provide the signal in the third band to the transceiver; and
a fourth electrical path configured to receive the signal in the second band from the fourth antenna and to provide the signal in the second band to the third RF circuit, wherein the processor is configured to:
allocate one available path among the third RF circuit, the fourth RF circuit, the third electrical path, and the fourth electrical path sequentially from a signal having a wider bandwidth from among the signal in the second band and the signal in the third band based on indicators respectively associated with receiving the signal in the second band and the signal in the third band, when the signal in the second band and the signal in the third band are received through the third antenna and the fourth antenna.

10. The electronic device of claim 1, wherein the second antenna is configured to resonate in the first band, the second band, and the third band, and
a fifth RF circuit configured to receive the signal in the first band from the first antenna and to provide the signal in the first band to the transceiver; and
a fifth electrical path configured to receive the signal in the first band from the second antenna and to provide the signal in the first band to the transceiver,
wherein the processor is configured to:
allocate one available path among the first RF circuit, the second RF circuit, the first electrical path, the second electrical path, and the fifth electrical path sequentially from a signal having a wider bandwidth from among the signal in the first band, the signal in the second band, and the signal in the third band based on indicators respectively associated with receiving the signal in the first band, the signal in the second band, and the signal in the third band, when the signal in the first band, the signal in the second band, and the signal in the third band are received through the first antenna and the second antenna.

11. A method for determining a communication signal receiving path of an electronic device, the method comprising:
receiving a signal in a first band and a signal in a second band;
obtaining indicators from an external device transmitting the signal in the first band and the signal in the second band;
comparing a bandwidth of the signal in the first band and a bandwidth of the signal in the second band when the signal in the first band and the signal in the second band are received;
allocating one available path, which transfers the signal in the first band or the signal in the second band, from among a plurality of paths sequentially from a signal having a wider bandwidth from among the signal in the first band and the signal in the second band based on the indicators respectively associated with receiving the signal in the first band and the signal in the second band; and
receiving the signal in the first band and the signal in the second band through the allocated paths, respectively.

12. The method of claim 11, wherein the allocating includes:
allocating one available path among the plurality of paths to a signal having a wider bandwidth from among the signal in the first band and the signal in the second band; and
allocating one available path among unallocated paths to a signal having a narrower bandwidth from among the signal in the first band and the signal in the first band.

13. The method of claim 11, further comprising:
when an indicator among the indicators is changed as much as a specified range or greater, reallocating one available path among the plurality of paths sequentially from a signal having a wider bandwidth from among the signal in the first band and the signal in the second band, based on the changed indicator.

14. The method of claim 11, further comprising:
aggregating the signal in the first band and the signal in the second band when the signal in the first band and the signal in the second band are received through the allocated path.

* * * * *